Patented Oct. 26, 1943

2,332,914

UNITED STATES PATENT OFFICE 2,332,914

PROCESS FOR PREPARING WHEAT CEREAL

Frank James, Normandy, Clifton A. Cobb, University City, and Lamar Kishlar, Webster Groves, Mo., assignors to Ralston Purina Company, St. Louis, Mo., a corporation of Missouri No Drawing. Application September 30, 1940, Serial No. 359,090

2 Claims. (Cl. 99—83)

This invention relates to a process for producing a marketable pre-cooked wheat cereal which can be quickly prepared for serving hot in the home and in restaurants and the like and which will be identical in flavor, aroma, and texture to the cereal food made by home cooking the original uncooked material to which our process is applied.

In view of the many advantages of a so-called "minute" or "instant" cereal of the type to be served hot, including that of being able to serve any patron of a restaurant a freshly prepared portion and of avoiding time and labor of home cooking and waste of unused portions, numerous proposals have heretofore been made for preparation of minute cereal products, but so far as we are aware these have not resulted in products which are the same in appearance, taste, or texture as when made by complete cooking of the original material immediately before serving.

As the result of a long period of work in this field, including much experimentation, we have discovered a process whereby raw granular wheat material can be treated with the result that when merely stirred in hot water preparatory to serving, it cannot be distinguished by a person eating it from an entirely home cooked portion of the same original material.

Our process is applicable to whole wheat or portions thereof in granular form. Raw cereals of this kind now on the market for preparation by home cooking are commonly referred to as "farinas" or as "whole-wheat" or "cracked wheat" cereals, depending on the parts of the wheat of which they are composed. In accordance with our process, water containing approximately 17% salt is added to the dry granular uncooked cereal and vigorously stirred until the salt water is uniformly distributed. The amount of water to be used we have found to be very critical. Experiments indicate that the most desirable percentage is approximately 12½% (by weight) of salted water to 87½% of cereal. A variation of more than 2½% in this amount of water changes the flavor and texture and also adversely affects the mechanical processing necessary to produce the final product.

After mixing the salted water with the dry cereal, the mixture is cooked in a pressure cooker of such type that no appreciable amount of water is added or removed from the cooking vessel during the cooking process. This is also extremely important as a discharge of moisture in the air even though replaced by additional water, adversely affects the flavor and texture of the resulting product. Preferably the cooking is accomplished in a closed vessel surround by a steam jacket, the cooking vessel being rotated during the cooking period. It is preferably provided with internal projections or rods on which the material impinges whereby the tumbling of the material by the rotation of the cooker is prevented from causing aggregation of part of the material into lumps of such consistency as cannot thereafter be changed back into granular form. The cooking time and temperature is so controlled as to avoid producing chemical and physical changes which would prevent accomplishment of our purpose of producing a product having the flavor and texture of the product produced by home cooking of the same material. It has been found experimentally that cooking from 12 to 16 minutes under a steam pressure in the outer jacket of 2½ to 4½ pounds is satisfactory. The cooking must not produce any "burnt" flavor nor such physical changes in the granules as would prevent separation of all of the cooked product into granular form by the means or equivalent next to be described.

After cooking, the material is worked through an 18 mesh screen by gentle agitation or stirring and, as before indicated, the prior treatment as to water content and character of cooking is such as to permit any aggregated portions of the product to be readily broken up into granules which will pass through such screen. After screening, the cereal is cooled to a suitable temperature for rolling which is approximately 100 degrees F. and is then rolled between pairs of smooth rolls to produce small flake-like particles of a thickness of approximately .009 inch and not having any surface dimension greater than about .09 inch. After flaking, the product is dried with warm air to a moisture content of about 6% which puts it in condition for packaging. The drying step should be carried out at a temperature not in excess of 140 degrees F. in order to avoid later development of rancidity. Small thin particles of this kind resulting from the described process, have great water absorptive capacity and quickly absorb water in the final preparation for serving hereinafter described.

The product of our process as above described is prepared for serving by stirring in hot water or hot milk in proportion of about ⅔ of a cup of cereal to 2 cups of liquid. In view of the physical conditions resulting from its preparation as above described, the water is quickly absorbed by the product and the same can be immediately served. As hereinbefore indicated, the highly desirable characteristic of the product made by our process is so nearly exactly the same flavor, aroma, and texture that it cannot be distinguished from a product made from the original raw granular cereal by complete home cooking as at present practiced.

Having fully described our invention, what we claim as new and desire by Letters Patent of the United States is:

1. The process of preparing a pre-cooked untoasted unpuffed wheat food which comprises mixing with dry granular particles of uncooked wheat water containing approximately 17% salt, said mixture being in proportion by weight of 10 to 15% of said salted water to 90 to 85% of wheat, cooking said mixture by cooking means preventing any substantial discharge or intake of moisture, screening the cooked product to restore any aggregated portions to granular form, rolling the granules into particles, and then drying the product to reduce its moisture content to approximately 6%.

2. The process of preparing a pre-cooked untoasted unpuffed wheat food which comprises mixing with dry granular particles of uncooked wheat water containing 17% salt in proportion by weight of approximately 12½% of water to 87½% of wheat, cooking said mixture by cooking means preventing any substantial discharge or intake of moisture, said product being agitated during cooking by means tending to prevent the formation of lumps, screening the cooked product to restore any aggregated portions to granular form, rolling the granules into particles the largest of which has no surface dimension exceeding approximately .09 inch, and then drying the product to reduce its moisture content to approximately 6%.

FRANK JAMES.
CLIFTON A. COBB.
LAMAR KISHLAR.